US00RE33919E

United States Patent [19]

Kristoff et al.

[11] E Patent Number: Re. 33,919

[45] Reissued Date of Patent: May 12, 1992

[54] PNEUMATIC STARTER FOR INTERNAL COMBUSTION ENGINE

[75] Inventors: John J. Kristoff; Michael Elwer, both of Marion, Ohio

[73] Assignee: Sycon Corporation, Marion, Ohio

[21] Appl. No.: 442,729

[22] Filed: Nov. 29, 1989

Related U.S. Patent Documents

Reissue of:

[64] Patent No.: 4,846,122
Issued: Jul. 11, 1989
Appl. No.: 167,402
Filed: Mar. 14, 1988

U.S. Applications:

[63] Continuation-in-part of Ser. No. 31,399, Mar. 27, 1987, abandoned, which is a continuation of Ser. No. 781,216, Sep. 26, 1985, abandoned.

[51] Int. Cl.[5] ..... F02N 17/00; F01C 1/344; F01C 21/00

[52] U.S. Cl. ..... 123/179.31; 418/152; 418/178; 418/260; 29/527.2; 29/888.025

[58] Field of Search ..... 418/152, 178, 260; 123/179 F; 29/156.4 WL, 527.2, 527.4, 888.025, 888.061

[56] References Cited

U.S. PATENT DOCUMENTS

| | | | |
|---|---|---|---|
| 2,802,452 | 8/1957 | Hogeman | 123/179 F |
| 3,191,852 | 6/1965 | Kaatz et al. | 418/152 |
| 3,552,895 | 1/1971 | Bayley | 418/178 |
| 3,633,360 | 1/1972 | Kelley | 123/179 F |
| 4,094,618 | 6/1978 | Kakui et al. | 418/178 |
| 4,170,210 | 10/1979 | Janik, Jr. | 123/179 F |
| 4,209,286 | 6/1980 | Schwartz | 418/152 |
| 4,276,007 | 6/1981 | Sakamaki et al. | 418/152 |
| 4,640,125 | 2/1987 | Carpenter | 418/178 |

FOREIGN PATENT DOCUMENTS

| | | | |
|---|---|---|---|
| 22103 | 1/1981 | European Pat. Off. | 418/152 |
| 2752233 | 6/1979 | Fed. Rep. of Germany | 418/152 |

OTHER PUBLICATIONS

McGraw-Hill Dictionary of Chemistry, p. 403.
Hackh's Chemical Dictionary (Fourth Edition), p. 435.
Metals Handbook (8th Edition), p. 509.
Marks, *Mechanical Engineers' Handbook*, (Sixth Edition), McGraw-Hill Book Co. Inc., 1958, pp. 13-65.

*Primary Examiner*—John J. Vrablik
*Attorney, Agent, or Firm*—Fay, Sharpe, Beall, Fagan, Minnich & McKee

[57] ABSTRACT

A starter arrangement for an engine includes a fluid actuated rotary vane motor which is adapted to engage an associated engine. The rotary motor has a plurality of blades or vanes with each of the blades being made from a fiber reinforced plastic material to reduce friction. A sleeve, in which the rotary motor is positioned, has on its inner surface a hard metallic coating to reduce friction. A relay valve member selectively provides a pressurized operating fluid to the rotary motor. The blade material and the sleeve inner surface coating cooperate to enable the vane motor, when it is actuated by the relay valve member, to rotate in the sleeve with a minimum of friction thereby obviating the need for a lubricating agent.

24 Claims, 2 Drawing Sheets

PNEUMATIC STARTER FOR INTERNAL COMBUSTION ENGINE

Matter enclosed in heavy brackets [ ] appears in the original patent but forms no part of this reissue specification; matter printed in italics indicates the additions made by reissue.

BACKGROUND OF THE INVENTION

This application is a continuation-in-part of patent application Ser. No. 031,399, filed on Mar. 27, 1987 and now abandoned, which in turn, is a continuation of patent application Ser. No. 781,216, filed on Sept. 26, 1985 and now abandoned.

This invention generally pertains to starters. More specifically, the present invention relates to a pneumatic starter for an internal combustion engine.

The invention is particularly applicable to an air starter designed for truck applications. However, it should be recognized that the pneumatic starter of the present invention may also be adapted for use in othe engine environments such as off-highway equipment, emergency generators, locomotives, dirt hauling equipment, compressors and the like.

When a compression ignition engine is started, its crankshaft must be rotated at a speed sufficient to compress the air in the cylinder to a pressure at which its temperature is sufficiently high to ignite the fuel injected into the cylinder. With the unavoidable leakage of some air past the piston rings, it is essential that the engine be turned over at a high rate of speed and this requires a substantial power output from the starter motor. A pneumatic motor or "air" motor is especially adapted for such starter applications since the motor can generate a large amount of power in a small frame size and since there is no reduction of its power output at either low temperatures or high temperatures as there would be with battery operated electric starters. The pneumatic motor is operably connected to the engine in such a way that the rotation of the motor causes it to engage and crank the engine until the engine becomes self-sustaining.

Such a pneumatic motor system includes a tank which contains a supply of pressurized fluid used to rotate the pneumatic motor. Systems of this type also commonly utilize a relay valve interposed between the pressurized tank and the pneumatic motor. This valve is normally closed and is selectively opened to feed pressurized fluid to the pneumatic motor to actuate the latter.

In one known positive displacement pneumatic motor, the blades or vanes of the motor engage an eccentrically located inner surface of a sleeve which provides a circumferential restraint but radial freedom of movement for the blades. The pneumatic motor is thus positioned within the sleeve in an eccentric manner so as to provide a number of chambers with the sleeve. The vanes are thrust into intimate contact with the sleeve and a considerable amount of frictional heat is generated. There is thus a need to provide lubrication to the motor to prevent undue wear of the vanes. If such a lubricating means is not provided, or if the lubricating means should fail, the sleeve and the vanes would become subject to failure in a very short period of time due to friction. Generally speaking, such a lubricating means includes a mechanism for entraining a measured charge of atomized lubricant into the air delivered to the starter at the beginning of each starting operation.

However, such lubricators are relatively expensive in relation to the cost of the entire air starter system, up to approximately one sixth of the cost of the whole air starter. Moreover, lubricators also add to the mechanical complexity of the entire system. Also, even with a lubricator system, a conventional air starter only has a lifetime of approximately 10,000 cycles by the end of which the sleeve is usually scored and rusted, due to moisture in the ambient air, and the vanes are worn.

Additionally, both bus operators and the marine industry have experienced annoying and costly problems with conventional air starters having lubrication systems. These problems emenate from frequent lubricator malfunctions which cause an "over lubrication" condition resulting in surplus lubricant being sprayed into the engine compartment. The lubricant is eventually dicharged into the atmosphere. In the case of diesel engine buses especially, lubricant discharged into the atmosphere worsens air pollution in urban areas. Generally, such lubricant fluid can be the diesel fuel used by the engine itself. Even when the conventional air starter lubricators are not malfunctioning, approximately 1 cc of lubricant fluid is discharged into the atmosphere on each engine start.

It is evident that the use of unlubricated air starter motors would be of great environmental benefit. Additionally, by providing an unlubricated air starter, a considerable sum of money could be saved in fuel costs per year, since the "saved" fuel would have been expended to lubricate a conventional air starter.

Accordingly, it has been considered desirable to develop a new and improved pneumatic starter for an internal combustion engine which would overcome the foregoing difficulties and others while providing better and more advantageous overall results.

BRIEF SUMMARY OF THE INVENTION

In accordance with the present invention, a new and improved starter arrangement for an engine is provided.

More particularly in accordance with the invention, the starter arrangement includes a fluid actuated rotary vane motor which is adapted to engage an associated engine. The rotary motor has a plurality of blades with each of the blades being made from a fiber reinforced plastic material to reduce friction and wherein the blades have a wear surface made of the same material. The rotary motor is positioned in a housing including a sleeve which has on its inner surface a hard metallic coating and a microfinish of less than 10 micro-inches R.M.S. to reduce friction. A relay valve means of the starter arrangement selectively provides a pressurized operating fluid to the rotary motor. When such operating fluid is provided, the blade material and the sleeve inner surface coating cooperate to enable the motor to rotate in the sleeve with a minimum of friction thereby obviating the need for lubricating system for the starter arrangement.

In accordance with another aspect of the invention, a starter arrangement for starting an internal combustion engine with compressed fluid is provided.

More particularly in accordance with this aspect of the invention, the arrangement includes a housing having a metallic sleeve and a fluid actuated rotary vane motor rotatably mounted in the sleeve. The motor has a plurality of vanes or blades with each of the blades being made from a fiber reinforced plastic material to reduce friction, wherein each of the blades has a wear surface made of the same material. Also, the sleeve has on its inner surface a hard metallic coating to reduce friction so that as the blade slides against the sleeve, minimal friction occurs. A source of pressurized fluid is provided for actuating the motor. The sleeve has a microfinish of less than ten micro-inches R.M.S.

In accordance with still another aspect of the invention, a pneumatic starter for an internal combustion engine is provided.

In accordance with this aspect of the invention, the starter includes an inner housing including a sleeve having on its inner surface a hard metallic coating a reduce friction. The coating comprises a chromium electro-coating having a hardness which measures at least 70 on the Rockwell C Scale. Also, the sleeve has a microfinish of less than 10 micro-inches R.M.S. A fluid actuated rotary vane motor is rotatably mounted in the sleeve. The motor has a plurality of blades with each of the blades being made from a fiber reinforced plastic material to reduce friction as the blades rotate in the sleeve. The fiber is made from an aramid material and the blades have a wear surface made of the same fiber reinforced plastic material. A source of pressurized air is provided for actuating the rotary motor. An eccentric cam is provided for positively displacing the blades when the motor is actuated.

One advantage of the present invention is the provision of a new pneumatic starter motor which runs with less friction than previous starters.

Another advantage of the invention is the provision of a starter arrangement which obviates the necessity for a separate lubricating system for the arrangement due to the reduced amount of friction which is generated as the starter motor operates because of the motor's improved self-lubrication properties.

Still another advantage of the invention is that the reduction in the amount of friction generated as the starter motor operates enables the elimination of the conventional expensive lubricator system contained in a traditional air starter as well as its attendant piping system. This reduces the cost of the air starter by approximately one sixth.

Yet an another advantage of the present invention is the provision of a lubrication-free air starter which eliminates a source of environmental polution in comparison to a conventional air starter have a lubricator system which discharges approximately 1 cc of lubricant into the atmosphere per start of the engine.

Yet still another advantage of the present invention is its provision of a lubrication-free air starter which can save a considerable amount of money per year per engine in fuel. The saved fuel would have been expended to lubricate a conventional air starter.

An additional advantage of the present invention is its provision of an air starter having an average life which can be up to ten or more times as long as that of conventional air starter due to its reduced friction characteristics.

Still other benefits and advantages of the invention will become apparent to those skilled in the art upon a reading and understanding of the following detailed specification.

BRIEF DESCRIPTION OF THE DRAWINGS

The invention may take physical form in certain parts and arrangements of parts, preferred embodiments of which will be described in detail in this specification and illustrated in the accompanying drawings which form a part hereof, and wherein.

DETAILED DESCRIPTION OF THE PREFERRED EMBODIMENTS

Figure 1:
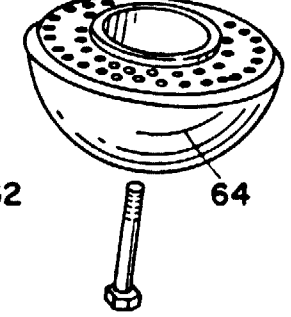
FIG. 1 is a schematic side elevational view of a starter arrangement and related components according to a first preferred embodiment of the present invention.
Figure 1:
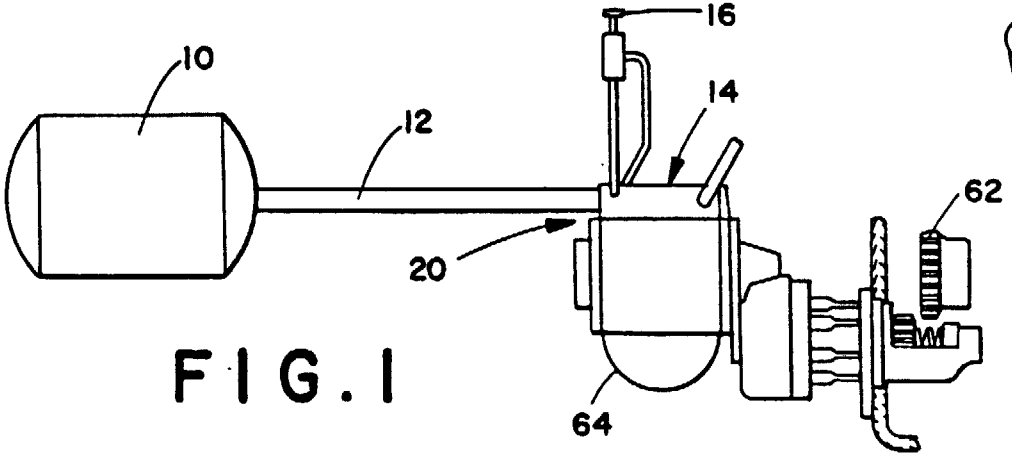

Referring now to the drawings, wherein the showings are for purposes of illustrating the preferred embodiments of the invention only and not for purposes of limiting same, FIG. 1 shows the subject new starter arrangement in a complete starter installation. While the starter arrangement is primarily designed for and will hereinafter be described in connection with a diesel internal combustion engine for a truck, bus, boat, or the like it will be appreciated that the overall inventive concept involved could be adapted for other engine environments, such as emergency generators, locomotives, dirt hauling equipment, compressors, and the like and also for engines other than diesel engines.

More particularly, the starter installation includes an air tank 10 which is connected by an air conduit 12 to a relay valve means 14. A manually actuated valve control member 16, which is usually positioned in the cab of a truck or other vehicle (not illustrated), controls the actuation of the relay valve means 14 of an air motor.

Figure 5:
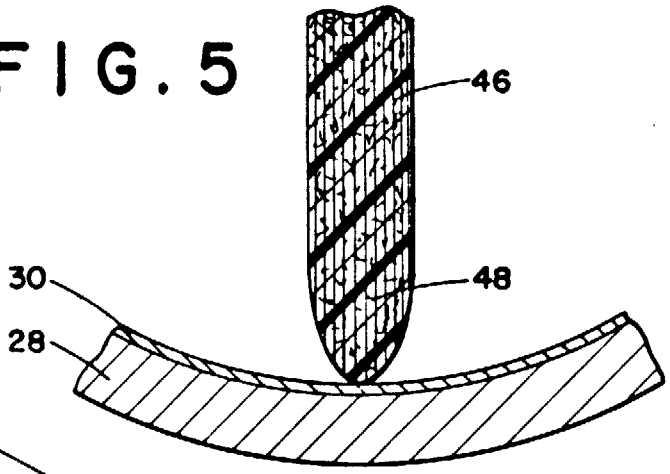
FIG. 5 is a greatly enlarged view through a portion of the starter arrangement of FIG. 4; and, FIG. 6 is a greatly enlarged view through a portion of a starter arrangement according to a second preferred embodiment of the present invention.
Figure 2:
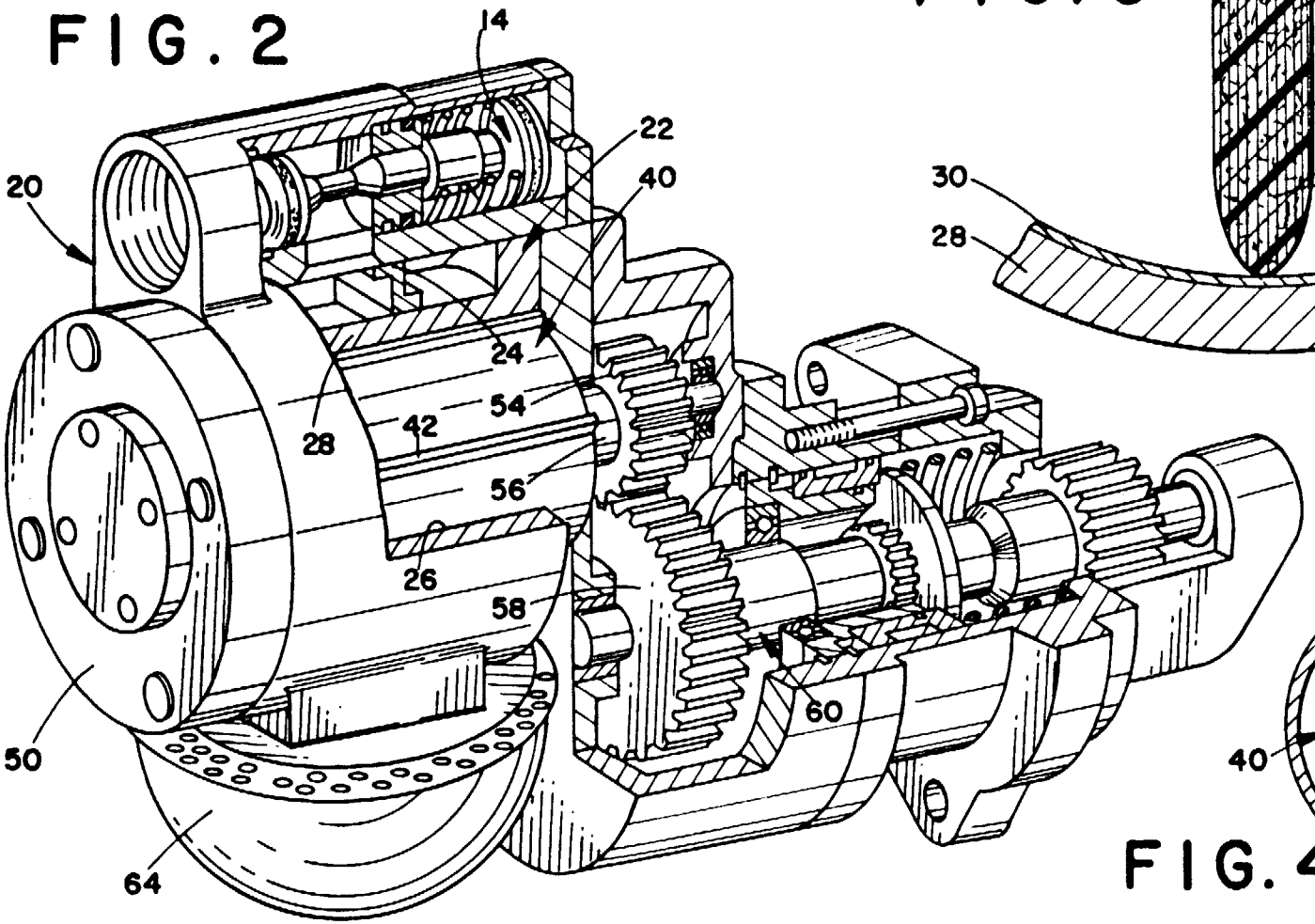
FIG. 2 is an enlarged perspective view, partially broken away, of the starter arrangement of FIG. 1.

With reference now also to FIG. 2, the valve means 14 is preferably positioned within a housing 20. Also positioned within the housing 20 is a sleeve 22 and a sleeve adapter 24 which admits pressurized fluid from the valve means 14 into a sleeve interior 26. The sleeve 22 has a body section 28 which has on its interior surface a coating layer 30 as best seen in FIG. 5.

In one preferred embodiment, the sleeve is made out of a metal such as gray iron and the sleeve coating is made of an "armoloy" material. Such a material is a hard chromium electrocoating having a hardness which measures at least 70 on the Rockwell C hardness scale. This coating is sold by the Armoloy Corporation of 118 Simonds Avenue, Dekalb, Ill. The coating is effective in increasing wear resistance in sliding surface contacts and provides superior corrosion and erosion resistance. This coating may be on the order of 0.0002 inches in thickness. It is evident that the thickness of layer 30 has been greatly magnified in FIG. 5 for easier visibility.

Alternatively, a metallic ceramic coating may be used for the inner surface of the sleeve. This coating combines metallic particles, such as aluminum particles, encapsulated in a ceramic with a slurry binder system. This coating also provides a great resistance to corrosion, erosion and abrasion. The thickness of such a protective film coating can vary from 0.001 to 0.006 inches. Such coatings are available from Metallic Ceramic Coatings, Inc., Front and Ford Streets, Bridgeport, Pa. Such a coating provides abrasion and corrosion resistance and aids in reducing friction between components.

Another such coating is a titanium nitride coating which is available from the Star Cutter Company of Farmington Hills, Mich. This type of coating can be applied through a physical vapor deposition process and will result in a coating thickness of 0.0001 to 0.0002 inches. The coating has a Rockwell C hardness of approximately 85. Such a coating effectively improves abrasion resistance and corrosion resistance.

Still another possible coating is an electroless nickel alloy. Such coatings may have a thickness of up to 0.001 inch if desired, although thicknesses as small as 0.0003 inches can also be used. An electroless nickel alloy also provides low friction properties and a smooth surface finish. Such a nickel coating can be obtained from the Armoloy Corporation of DeKalb, Ill. A nickel alloy coating of this type can be infused with a polymer such as fluorocarbon to provide an inherent lubrication. Such a polymer infused nickel alloy coating is available from General Magnaplate Corp., of Linden, N.J.

Figure 3:
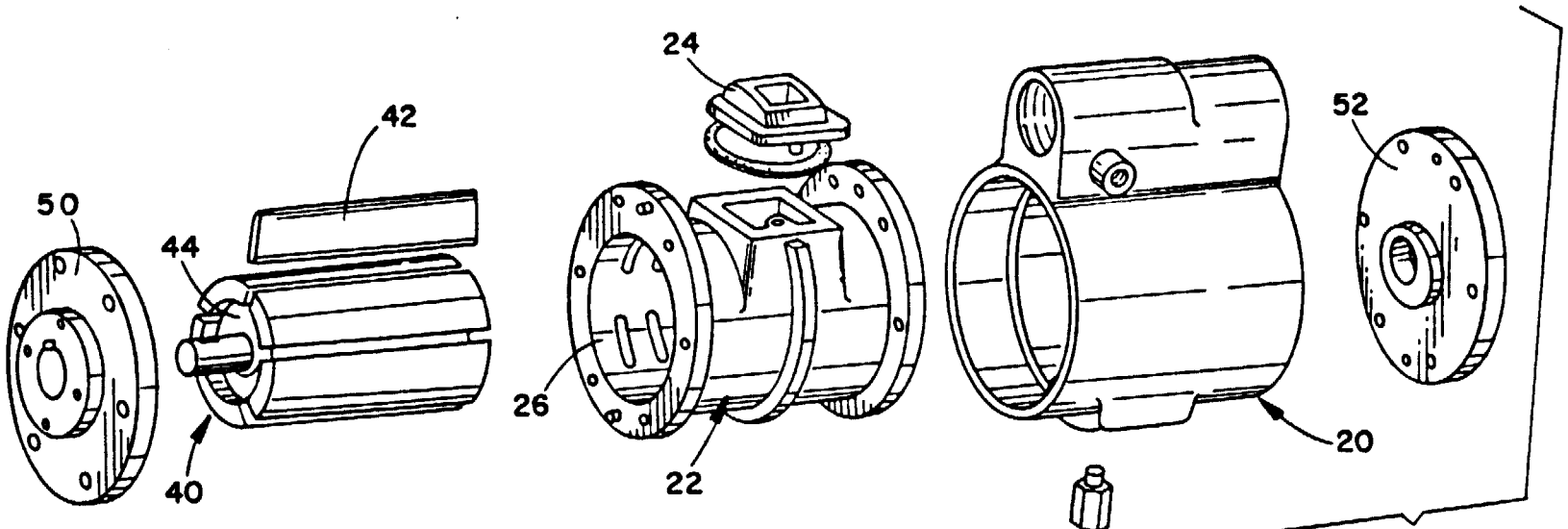
FIG. 3 is a reduced exploded perspective view of certain components of the starter arrangement of FIG. 2.
Figure 4:
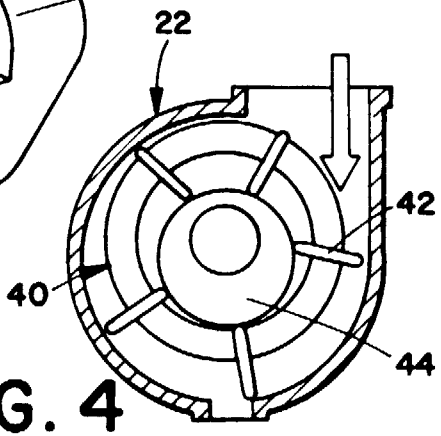
FIG. 4 is a schematic cross-sectional view of the starter arrangement of FIG. 2.

With reference now also to FIG. 3, positioned in the sleeve interior 26 is a rotor 40 having at least one rotor vane or blade 42 thereon. In the preferred embodiment, five such rotor blades 42 are provided but, of course, any suitable number of blades can be used. Driving the rotor blades 42 is an eccentric cam 44 as may best be seen from FIG. 4. The eccentric cam 44 prepositions the blades 42 into the air stream flow from the air tank through the relay valve means 14. This design is considerably more tolerant of contaminants and frost than most prior art designs and provides instant torque and starting reliability even under adverse weather conditions.

With reference now to FIG. 5, it can be seen that each blade has a blade body 46 which is provided with a plurality of strand-like reinforcing elements 48. In one preferred embodiment, the reinforcing fiber is an aramid fiber, such as KEVLAR brand fiber sold by E. I. duPont de Nemours Corp. of Wilmington, Del., which also provides great flexural strength as the blade rotates in the sleeve.

Other reinforcing fiber could, of course, also be used. Among these fibers are glass fibers, boron fibers, and carbon fibers, i.e. graphite fibers. The fibers are preferably woven into a "cloth" which is then coated with a resin binder. The resin coated "cloth" is set in a humidity chamber. A plurality of superimposed layers of such cloth, depending on the thickbess desired for the blade, are then provided in a sheet to a press. The press applies heat and pressure to the sheet to bind the several layers together. Thereafter, blades can be fabricated from the sheet.

If the fibers are made of glass, the resin can be an epoxy. On the other hand, if the fiber are aramid, the resin can be phenolic. Of course, the various layers of fibers in the blade can be oriented in different directions or in the same direction, as desired. One advantage of such reinforced plastic blades is that they are friction resistant. Another advantage is that they are not prone to rusting thereby increasing the life cycle of the air starter.

In order to provide an airtight chamber, the sleeve 22 is provided on each end with a respective end plate 50, 52 as shown in FIG. 3. With reference again to FIG. 2, a gear element 54, which is driven by the rotor 40 through a shaft 56, is positioned adjacent the second end plate 52. A second gear 58 is driven by the first gear 54.

The second gear 58 is part of a drive means 60 for transmitting the power of the vaned motor to an internal combustion engine having a flywheel ring gear 62 (see FIG. 1). Also positioned on the housing 20 is an integral muffler 64.

In the present invention it has been found that the use of a sleeve coating 30 reduces the coefficient of friction of the rotor blades 42 as they rotate against the sleeve 22. Also, the rotor blades are made of a suitable fiber reinforced plastic material which further reduces friction. Such friction has in the past been responsible for the wear and corrosion of the sleeve 22.

A conventional air starter has an average lifetime of approximately 10,000 cycles. Depending on the frequency of the starts per day, such 10,000 cycles can be accumulated in 3 to 8 years of use. At the end of this time, the sleeve of the starter may have rusted or scored so as to be unusable and the blades generally have become worn despite the use of a lubricating system which supplies lubricant for the sleeve and the blades.

In a test of an air starter constructed according to the present invention, however, the use of the "armoloy" material together with aramid fiber reinforced plastic blades, resulted in minimal wear to the blades over 10,000 cycles of the air starter despite the absence of a lubricating system. It was found that blade wear was less than 0.010 inches even without external lubrication. It was also found that there was negligible wear on the sleeve. It is estimated that the construction of an air starter from the materials listed above will increase the life cycle of the air starter up to at least 14,000 cycles and perhaps to as much as 30,000 cycles. Besides a longer life cycle for the air starter, the elimination of an external lubrication system results in a considerable savings on the cost of the air starter and also results in a much simpler and mechanically less complex unit.

In the preferred embodiment, the blades are made of aramid fiber reinforced plastic which can have a coefficient of thermal expansion of approximately $35.3\times10^{-6}$ inches/inch °C. linearly and approximately $32.9\times10^{-6}$ inches/inch °C. crosswise. In contrast, the sleeve, which is made of cast iron can have a coefficient of thermal expansion of $12.96\times10^{-6}$ cm/cm °C.

Figure 6:
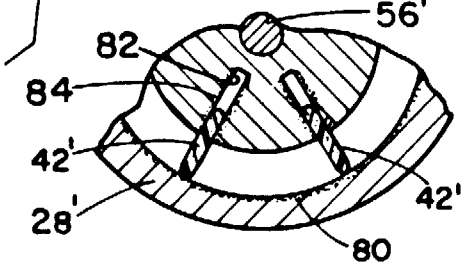

With reference now to a second preferably embodiment of the invention, as illustrated in FIG. 6, the invention is there shown as having another construction. For ease of illustration and appreciation of this alternative, like components are identified by like numerals with a primed (') suffix and new components are identified by new numerals.

In this FIGURE, the interior surface of a sleeve body 28' has been given a very smooth surface. The surface was reduced from 40 micro-inches, as in the embodiment of FIG. 5, to approximately 8 to 10 micro-inches, and ideally to 5 micro-inches R.M.S. in the embodiment of FIG. 6. This finish is achieved by honing the sleeve interior surface using the finest honing stone presently available. Previously, a rougher finish was acceptable for the sleeve inner surface since lubrication was provided during each start of the air motor. Now a smoother sleeve inner surface finish is considered very desirable despite its additional cost.

Extensive testing has revealed that the surface finish of the inner wall of the sleeve is critical in determining the life expectancy of the air starter. In this regard, while a surface finish of 40 micro-inches might allow up to 15 to 20,000 cycles on the air starter of FIG. 5 before failure, a microfinish of approximately 8 micro-inches has given a significantly longer life. More specifically, a test run on such an air starter having such a sleeve microfinish has exceeded 125,000 cycles without failure of the blades. Eventually, a rotor shaft 56' of the air starter failed due to metal fatigue. However, there was a minimum of scoring or pitting on the sleeve surface and a minimum of wear on the vanes.

The inner surface of the sleeve body 28' can be provided with a coating 80 which can be made of hard chromium electro-coating, such as armoloy, having a hardness which measures at least 70 on the Rockwell C hardness scale. Hardness tests also indicate a measurement of from 1020 to 1100 on the Vickers Diamond Pyramid Hardness Scale. This equals 70 to 72 on the Rockwell C Scale. The armoloy material conforms to the existing surface of a body including threads, flutes, scratches, etc. with detail down to approximately 8 micro-inches R.M.S. Additionally, armoloy will not affect a growth on the surface of the material more than 0.0002 inches under normal circumstances thereby eliminating the need for undersized design calculations in most applications. The coating 80 works its way into the surface of the sleeve material and adheres so positively that it will not chip, peel, crack, or flake when subject to standard ASTM bend tests over a radius equal to half the thickness of the material to which it is applied.

Roughness, the finely spaced surface texture irregularity resulting from the manufacturing process or the cutting action of tools or abrasive grains, has in general a greater effect on performance than any other surface quality. The control of roughness appears to be very important in prolonging the life of the air starter.

If desired, a slot 82 in a hub in which a vane 42' reciprocates can also be coated with a suitable hard material coating 84 such as armoloy. This may be advantageous in preventing the pitting or scoring of the slot 82 as well as in preserving the vane material from scratches or other surface degredation. The coating material 84 may be the same as the coating 80 on the inner surface of the sleeve or it may be another low friction coating material.

The subject invention thus provides an air starter arrangement which produces less friction as the blades rotate in a sleeve than do conventional systems. Therefore, the present arrangement enables the elimination of conventional lubrication systems which are used in air starters thus resulting in a considerable cost and material savings on the starter arrangement.

Through a judicious selection of coating materials and vane materials as well as through the provision of a microfinish on the sleeve inner surface in the range of 8 to 10 micro-inches, a tenfold increase has been achieved in the life expectancy of air starters for engines. More specifically, while a conventional air starter has a life expectancy of approximately 10,000 cycles by the end of which the sleeve is usually scored and rusted and the vanes are worn, an air starter according to the present invention can have a life expectancy of more than 100,000 cycles.

The invention has been described with reference to preferred embodiments. Obviously, modifications and alterations will occur to others upon the reading and understanding of this specification. It is intended to include all such modifications and alterations insofar as they come within the scope of the appended claims or the equivalents thereof.

Having thus described the invention, it is now claimed:

1. A starter arrangement for an engine, comprising:

a fluid actuated rotary vane motor which is adapted to engage an associated engine, said rotary motor having a hub and at least one blade which is slidably mounted in said hub and is made from a fiber reinforced plastic material to reduce friction, and wherein said at least one blade has a wear surface made of the same material;

a housing including a sleeve in which said rotary motor is positioned, said sleeve having on its inner surface a hard metallic coating to reduce friction, wherein said sleeve inner surface coating comprises a chromium [electrocating] *electrocoating* having a hardness which measures at least 70 on the Rockwell C hardness scale and a microfinish of [less than] *approximately* 10 micro-inches R.M.S.; and,

[a relay valve means for selectively providing a pressurized operating fluid to said rotary motor, ] wherein said blade material and said sleeve inner surface coating cooperate to enable said motor to rotate in said sleeve with a minimum of friction thereby obviating the need for a lubricating system for the starter arrangement.

2. The arrangement of claim 1 wherein said fiber reinforcing material for said at least one blade is selected from the group consisting of aramid fiber, glass fiber, boron fiber or carbon fiber.

3. The arrangement of claim 1 further comprising:

a source of pressurized operating fluid;

a conduit means for interconnecting said source of operating fluid and [said] *a* valve means; and, a driving means for transmitting the rotation of said motor to the associated engine and wherein said driving means includes a pinion gear which cooperates with a flywheel of the associated engine to rotate said flywheel.

4. The arrangement of claim 1 further comprising:

a muffler which is secured to said housing; and, an eccentric cam which urges said at least one blade outwardly as said vane motor rotates.

5. The arrangement of claim 1 wherein said at least one blade comprises an aramid fiber reinforced resin material.

6. The arrangement of claim 1 wherein said at least one blade comprises a plurality of superimposed layers of a reinforcing fiber cloth coated with a resin binder.

7. The arrangement of claim 1 further comprising a hard metallic coating provided on a portion of said hub adjacent said at least one blade to reduce friction between said hub and said at least one blade as said at least one blade slides in said hub.

8. The arrangement of claim 7 wherein said hub hard metallic coating comprises a chromium electrocoating having a hardness which measures at least 70 on the Rockwell C hardness scale.

9. A starter arrangement for starting an internal combustion engine with compressed fluid, comprising:

a housing including a metallic sleeve wherein said sleeve has on its inner surface a hard metallic coating which measures at least 70 on the Rockwell C hardness scale, said coating on said sleeve having a microfinish of [less than] *approximately* 10 micro-inches R.M.S.;

a fluid actuated rotary vane motor rotatably mounted in said sleeve, said motor having a plurality of blades with each of said blades being made from a plurality of layers of a resin-coated fiber cloth material to reduce friction wherein each of said blades has a wear surface made of the same material, and wherein as said blades slide against said sleeve there is minimal friction occurring thereby obviating the need for a separate lubricating system for the starter arrangement [; and, a source of pressurized fluid for actuating said rotary motor].

10. The arrangement of claim 9 further comprising a motor housing in which said sleeve and [said] *a* relay valve are positioned.

11. The arrangement of claim 9 wherein said blade reinforcing material comprises an aramid fiber.

12. The arrangement of claim 9 wherein said sleeve inner surface coating comprises a chromium electrocoating having a hardness which measures at least 70 on the Rockwell C hardness scale.

13. The arrangement of claim 9 wherein said sleeve inner surface coating comprises metallic particles encapsulated in a ceramic material, and a slurry binder system.

14. The arrangement of claim 9 wherein said sleeve inner surface coating comprises titanium nitride having a hardness on the Rockwell C hardness scale of approximately 85.

15. The arrangement of claim 9 wherein said sleeve inner surface coating comprises an electroless nickel alloy.

16. The arrangement of claim 15 wherein said nickel alloy coating is infused with a polymer such as fluorocarbon.

17. An unlubricated, and hence environmentally desirable, pneumatic starter for an internal combustion engine, comprising:

an integral housing including a sleeve having on its inner surface a hard metallic coating to reduce friction, said coating comprising a chromium electrocoating having a hardness which measures at least 70 on the Rockwell C hardness scale and wherein said coating on said sleeve has a microfinish of less than 10 micro-inches R.M.S.;

a fluid actuated rotary vane motor rotatably mounted in said sleeve, said motor having a hub and a plurality of blades with each of said blades being made from an aramid fiber reinforced plastic material to reduce friction as said blades rotate in said sleeve, wherein said blades have a wear surface made of the same fiber reinforced plastic material;

a source of pressurized air for actuating said rotary motor; and, an eccentric cam for positively displacing said blades in relation to said hub when said motor is actuated, the rotation of said vane motor in said sleeve, causing a minimum of friction thereby obviating the need for a separate lubricating system.

18. The starter of claim 17 wherein said hub has a plurality of slots, one for slidably mounting each of said plurality of blades, and further comprising a hard metallic coating provided on a surface of said hub at each of said slots to reduce friction between said hub and said blades as said blades slide in said hub.

19. The arrangement of claim 18 wherein said hub hard metallic coating comprises a chromium electrocoating having a hardness which measures at least 70 on the Rockwell C hardness scale.

*20. A starter arrangement for a compression ignition engine, comprising:*

*an air actuated rotary vane starter motor which is adapted to engage the compression ignition engine, said rotary motor having a hub with a slot therein, wherein said hub slot includes a hard metallic coating to reduce friction;*

*a blade which is slidably mounted in said hub slot, said blade comprising a fiber reinforced plastic material to reduce friction; and,*

*a housing including a sleeve in which said hub and blade are positioned, said sleeve having on its inner surface a hard metallic coating to reduce friction, wherein said sleeve comprises a ferrous material and wherein said hard metallic coating on said hub slot and on said sleeve inner surface is a material selected from the group consisting of chromium, nickel and titanium, wherein said blade material, hub slot coating and sleeve inner surface coating cooperate to enable said motor to rotate with a minimum of friction thereby obviating the need for a lubricating system for the starter arrangement.*

*21. The starter arrangement of claim 20 wherein said housing sleeve hard metallic coating has a hardness which measures at least 70 on the Rockwell C hardness scale.*

*22. The starter arrangement of claim 21 wherein said housing sleeve hard metallic coating has a microfinish of less than 10 microinches RMS.*

*23. The starter arrangement of claim 20 wherein said hub slot hard metallic coating has a hardness which measures at least 70 on the Rockwell C hardness scale.*

*24. The starter arrangement of claim 23 wherein said hub slot hard metallic coating has a microfinish of less than 10 microinches RMS.*

* * * * *